UNITED STATES PATENT OFFICE.

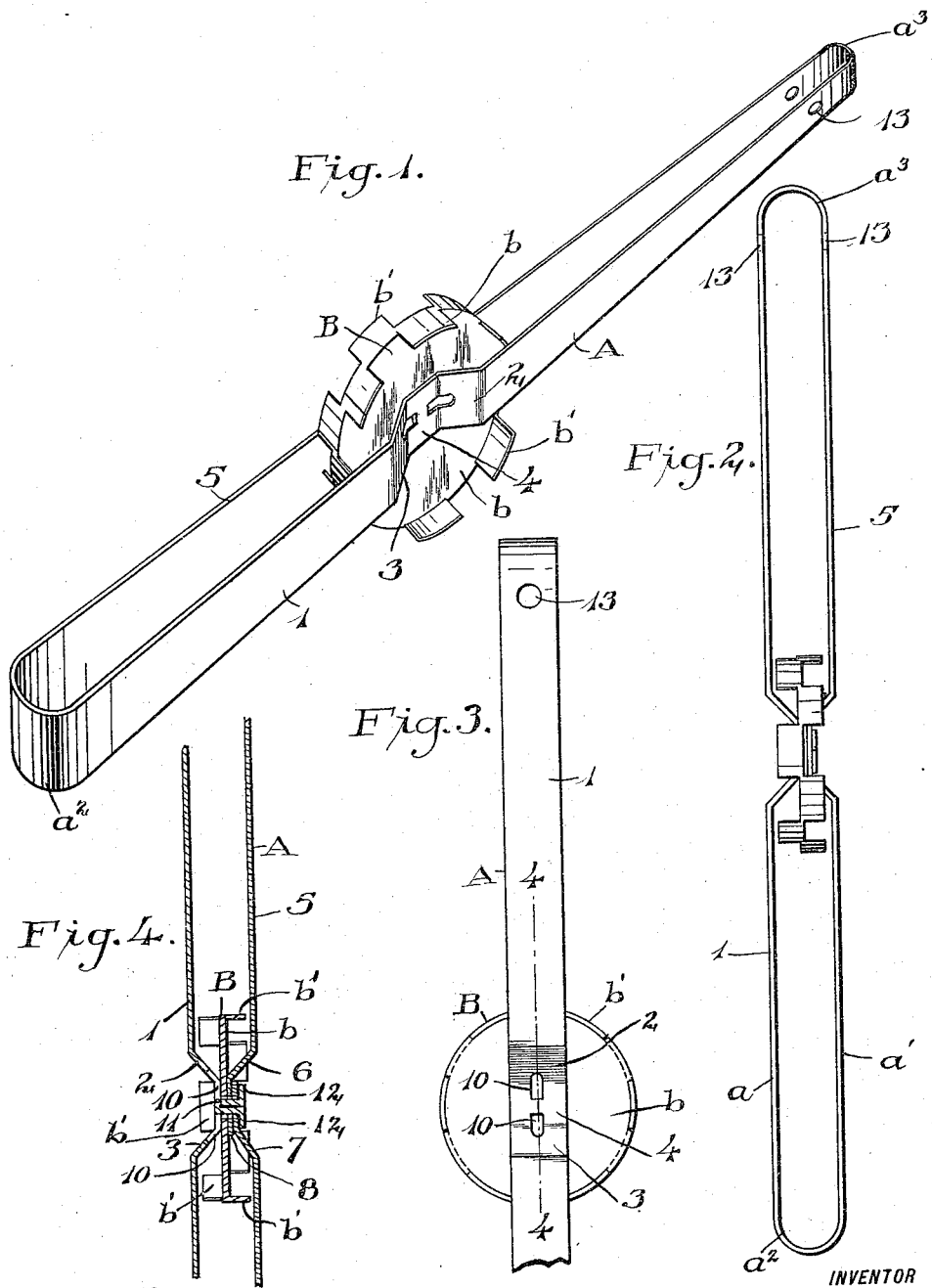

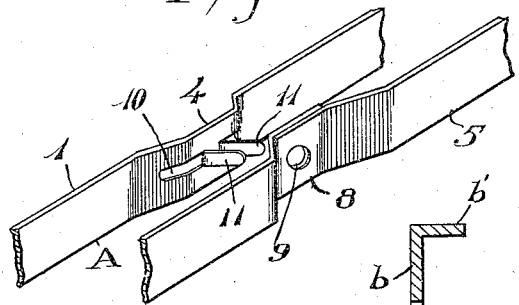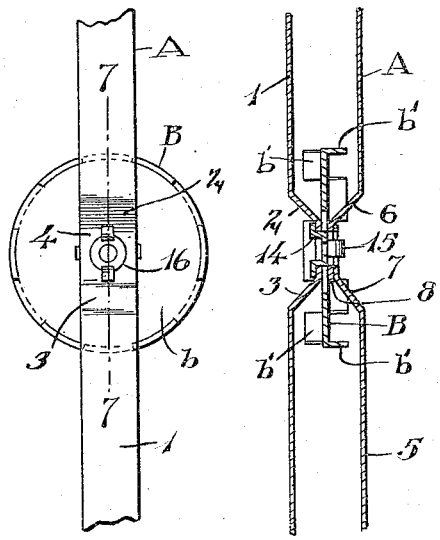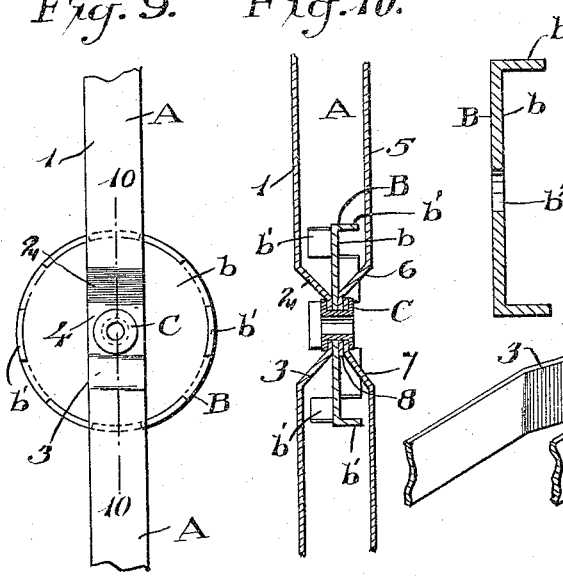

GEORGE C. D. MILLER, OF NEW YORK, N. Y., ASSIGNOR TO CARY MANUFACTURING COMPANY, OF NEW YORK, N. Y., A CORPORATION OF NEW YORK.

REEL AND HANGER FOR BOX-STRAPPING.

1,173,837.  Specification of Letters Patent.  Patented Feb. 29, 1916.

Application filed June 29, 1912. Serial No. 706,543.

*To all whom it may concern:*

Be it known that I, GEORGE C. D. MILLER, a citizen of the United States, residing in the city of New York, borough of Brooklyn, county of Kings, and State of New York, have invented a certain new and useful Reel and Hanger for Box-Strapping, of which the following is a specification.

This invention is a reel and hanger on which box strapping may be coiled for shipment and uncoiled for use, and the object of the invention is to construct a device of the character specified out of sheet metal in a simple and economical manner, and to produce a device which is light and compact in construction and efficient in operation.

With the specified objects in view, the invention embodies a sheet metal support or hanger in which is securely journaled a spool or bobbin of such construction that it may be readily stamped from sheet metal.

The preferred construction of the spool or bobbin is a centrally perforated flat disk provided near its periphery with short substantially radial slits with the portions between the slits bent alternately in opposite directions and perpendicular to the plane of the disk, thereby forming the rim of the spool.

The hanger is preferably made of a continuous piece of strap iron the ends of which are doubled so as to produce two loops, the said ends overlapping, and, in conjunction with the opposing side of the hanger, serving to form, by means of one expedient or another, a support or journal for the spool. The said ends and side member are bent inwardly to form cheeks between which the spool disk is positioned. The inwardly bent portions of the hanger, *i. e.* the cheeks, bear against the disk portion of the spool for the purpose of retaining said spool in a centrally disposed position within the hanger and preclude it from lateral displacement.

I have several ways for securing the spool in a rotatable position within the hanger. The preferred method, however, consists in employment of a rivet, preferably tubular, extending through alined perforations in the cheek pieces and disk of the spool, respectively, the ends of the rivet being then upset so as to retain it from displacement.

Features of the invention other than those specified will appear from the following detailed description.

In the accompanying drawings, I have illustrated different practical embodiments of the invention, but the constructions shown therein are to be understood as illustrative, only, and not as defining the limits of the invention.

Figure 1 is a perspective view of the new reel and hanger for box strapping constructed in accordance with one form of the invention. Fig. 2 is an elevation looking at the edge of the hanger and the rim of rotatable spool. Fig. 3 is a side view looking at the device from the left of Fig. 2. Fig. 4 is a vertical section on the line 4—4 of Fig. 3. Fig. 5 is a detail perspective view of one form of the hanger partly broken away and with the spool omitted, illustrating one embodiment of means for uniting the free ends of the strap which forms the housing of the hanger, and a journal for the rotatable spool. Fig. 6 is a side elevation of another embodiment of the invention wherein the spool is provided with means for rotatably mounting it within the housing or hanger. Fig. 7 is a vertical section on the line 7—7 of Fig. 6. Fig. 8 is a vertical cross section through the spool employed in the construction of Figs. 6 and 7. Fig. 9 is a side elevation of another embodiment of the hanger illustrating a rivet for connecting the lapping ends of the housing and said rivet forming a journal for the rotatable spool. Fig. 10 is a cross section on the line 10—10 of Fig. 9. Fig. 11 is a cross section of the spool employed in the construction of Figs. 9 and 10. Fig. 12 is a perspective view of the hanger partly broken away, with the spool omitted, and showing the relation of the cheek pieces between which the spool is retained when in operative position within the holder. Fig. 13 is a detail perspective view of a tubular rivet adapted for use in the construction of Figs. 9 and 10.

Referring more particularly to Figs. 1, 2, 3, 4 and 5, the hanger or reel embodies two main elements, a frame or housing A and a spool or bobbin B, said spool being positioned within the frame or housing, intermediate the ends thereof, and mounted for free rotation within said frame or housing. In a preferred form of construction, the frame is composed of strip metal and the spool is composed of sheet metal.

Frame or housing A is made from a strip or length of metal substantially uniform in width, said length of strip metal being cut from a piece of bar metal, and thereafter doubled upon itself and manipulated in a particular way to produce the frame or housing in accordance with this invention. As shown more clearly in Fig. 2, the strip or length of sheet metal is doubled or folded to produce parallel sides 1, 5 and loops $a^2$, $a^3$ at the respective end portions of the frame or housing, the two free ends of the length of metal being positioned in overlapping relation when the parts are properly assembled, as shown in Fig. 4.

Proceeding now to a more detailed description of the sheet metal frame, the side 1 is bent inwardly at 2, 3 intermediate the ends so as to produce a cheek piece 4 between the inclined inwardly bent portions 2, 3, said bent portions 2, 3, 4 constituting one cheek member on the side 1 of the frame. After bending the length of metal at $a^2$, $a^3$ the two free ends are brought into parallel relation to the side 1 so as to produce the side 5, the two free ends of the metal are then bent inwardly at 6, 7 and said free ends are then brought into overlapping relation to produce a cheek member 8, the latter being parallel to the cheek member 4. The cheek members 4, 8 are positioned quite closely together and parallel to each other, the distance between the cheek members 4, 8 being very much less than the distance between the sides 1, 5 of the frame, whereby the cheek members 4, 8 are positioned for engagement with the respective faces of the disk of spool or bobbin B for the purpose of serving as guides for said spool, thereby precluding displacement or movement of the spool within the frame. The free overlapping end portions of said member 5 are provided with perforations 9 adapted to register or aline with each other. The other side member 1 has its cheek piece cut or slotted at 10 so as to produce tongues 11, the metal being slotted lengthwise of the inwardly extending portions 2, 3 and the cheek piece 4, as shown more particularly in Fig. 5, and the tongues 11 being bent inwardly with respect to the member so as to pass through the alined apertures 9 in the cheek piece 8, after which the free ends of said tongues 11 are bent outwardly at 12, see Figs. 3 and 4, whereby the tongues on one cheek piece 4 are adapted to secure the free ends of the sheet metal band in predetermined relation.

The spool or bobbin is preferably stamped from a single piece of sheet metal, said spool consisting of a disk $b$ and a rim $b'$. When the disk is stamped from a piece of sheet metal a series of radial slits or incisions are formed in the periphery of the disk, and thereafter the slitted edge of the disk is bent alternately in opposite directions so as to produce the rim, that is to say, one piece of the sheet metal disk is bent in one direction to produce a section of the rim, the two adjoining pieces are bent in an opposite direction to produce other sections of the rim, and so on throughout the peripheral edge of the disk, whereby the spool is provided with a rim which is integral with the disk, the width of said rim exceeding the thickness of the disk. The rim presents a comparatively wide surface which is substantially cylindrical, although not continuous, and upon this wide substantially cylindrical surface of the spool is adapted to be coiled a box strapping or other material which is to be housed or contained within the hanger. The disk is provided with a central aperture, and through this aperture extends the tongues 11 when the parts are properly assembled, said tongues 11 constituting a journal on which the spool is rotatably mounted. The spool is positioned between the side members 1, 5 of frame A, and it is supported between the cheek pieces 4, 8 and upon the journal afforded by the tongues 11. The wide rim $b'$ of the spool is positioned within the wide space between the parallel side members 1, 5 so that the spool will rotate freely within the frame or housing, but sidewise movement of the spool is precluded by cheek pieces 4, 8 which are positioned to contact with the respective sides of disk $b$ forming a part of the spool.

By reference to Figs. 2 and 4 it will be noted that the inwardly extending members 2, 3 and 6, 7 on the parallel side members 1, 5 extend inwardly toward the disk of the spool, within the wide rim thereof, and thus the cheek pieces 4, 8 are positioned in very close relation to the respective faces of the disk $b$, whereby the cheek pieces serve as guides to the spool in preventing any sidewise movement of said spool within the hanger.

The operation is as follows: The box strapping is coiled around the rim of the spool before the latter is placed within the frame or hanger. This operation of coiling the box strapping is accomplished in any usual or desired way, after which the free end of the strap is attached to the coil in order to preclude uncoiling of the strapping. The frame is now opened by separating the free ends composing the side member 5, and the spool with the coil of strapping thereon is easily positioned within the frame. The check pieces 4, 8 are now pressed together so that the tongues 11 pass through the central aperture of the spool and through the apertures 9 in the free ends composing the side member 5, after which the ends of said tongues are bent in opposite directions as at 12, thus completing the operation of placing the coiled strapping within the frame and securing the several parts in proper operative relation to each other. The tongues 11 serve two purposes, first, they secure the free ends of the sheet metal band forming the frame in fixed or predetermined relation to each other so that all the parts of the frame or hanger are attached in a simple and strong manner, and, second, said tongues 11 form a stationary journal upon which the spool is free to turn. The frame or hanger is shown as having apertures 13 near the looped end $a^3$, through which apertures is adapted to pass a wire, hook or any other suitable device for the purpose of suspending the entire reel in a manner for the operator to draw the strapping from the spool.

The construction of Figs. 6, 7 and 8 embodies the generic features of the sheet metal frame and the sheet metal spool, but the particular means for mounting the spool and for retaining in proper relation the free ends of the metal composing the frame are modified in the following particulars. Instead of providing tongues on one side member of the frame, the spool B′ is provided at its middle with two pairs of tongues 14, 15 composed of metal struck up from the disk $b$. The tongues 14 are bent from the disk so as to extend in one direction therefrom, whereas the tongues 15 are bent to extend in an opposite direction from the disk. The cheek piece 4 on side member 1 of the frame is provided with a circular aperture 16, whereas the free ends of the side member 5 composing the other cheek piece 8 are provided with registering apertures. The spool, after the strap shall have been coiled thereon, is positioned within the frame so that the tongues 14 extend through the aperture 16 in cheek piece 4, whereas the tongues 15 extend through the apertures in the free overlapping ends of the side member 5, after which tongues 14 are bent to overlap the edges of the aperture 16, and tongues 15 are bent to overlap the edges of the openings in the overlapping end portions of the side member 5. By bending the tongues 14, 15, the spool is connected with the cheek pieces and the free ends composing the member 5 are retained in predetermined relation to each other. The tongues 14, 15 of the spool are free to turn within the circular apertures provided in the cheek pieces 4, 8 of the respective side members composing the frame, and thus the spool is rotatably supported within said frame.

Instead of providing means integral with the frame or the spool for supporting said spool rotatably within said frame, I may use a rivet C, as shown in Figs. 9 to 13, inclusive. The frame is provided with openings 18 in the respective cheek pieces 4, 8, and the disk of the spool is provided with an aperture $b^2$, the latter being in alinement with the apertures 18. The rivet C passes through the alined apertures in the disk of the spool and in the cheek pieces of the frame, as shown in Fig. 10, and the ends of said rivet are flanged or headed so that one head will engage with one cheek piece and the other head will engage with the other cheek piece. The rivet is preferably tubular to facilitate the operation of upsetting the ends thereof and this rivet serves the purpose of a journal for rotatably supporting the spool within the frame.

From the foregoing description it will be apparent that I have provided a reel or hanger, the frame and the spool of which are composed of sheet metal, whereby each part may be easily, rapidly and economically manufactured. The coil of strapping may be rapidly wound upon the spool, and said spool easily placed in position, after which the several parts are secured together by a simple and efficient fastening means. The spool being free to rotate within the frame, the strapping may be drawn from the spool as required during the operation of applying the strap to boxes, packing cases, etc. The several parts of the hanger are secured together firmly so that the frame will not become accidentally separated or opened.

Having thus fully described the invention, what I claim as new, and desire to secure by Letters Patent is·

1. In a structure of the class described, the combination of a hanger, and a spool rotatably mounted therein, said spool consisting of a substantially flat disk and a circular rim formed by flanges extending from the periphery thereof in alternate directions, said flanges being at right angles to the faces of the disk and curved in cross section so as to produce a circular surface upon which a flat strap is adapted to be compactly coiled.

2. In a structure of the class described, the combination of a hanger, and a spool rotatably mounted therein, said spool consisting of a substantially flat disk and having a rim formed by integral flanges extending from the periphery of said disk in alternate directions and in planes substantially perpendicular to the plane of the disk.

3. A holder for coiled box strapping embodying a hanger formed by bending a single metal strap to produce side members, the middle portions of which are bent toward each other to form parallel cheeks, and a spool rotatably supported in the hanger between the cheeks thereof, said spool having a single flat web and a circular rim bent from said web, the width of said rim exceeding the space between the cheeks.

4. A holder for coiled box strapping comprising a hanger formed by bending a strap of metal to produce a plurality of side members, the end portions of said strap being positioned in overlapping relation and bent to form a cheek on one side member and the other side being bent to form a cheek disposed parallel to the first named cheek, the hanger being of less width between said cheeks than at the remaining portion thereof, a spool positioned within the hanger intermediate said cheek pieces, and means connecting the lapped end portions of the hanger strap, said connecting means operating as a journal for rotatably supporting the spool.

5. A holder for coiled box strapping embodying an elongated frame within which the coil of box strapping is adapted to be positioned, said elongated frame being provided on its side members and intermediate the ends thereof with cheeks extending inwardly from said side members and positioned in parallel relation to each other so that the space between the cheeks is less than the width of the space in the frame, and a spool embodying a single web provided with a wide rim, formed by bending said web, whereon the box strapping is coiled so as to lie between the sides of the frame, said single web of the spool being positioned intermediate the cheeks of the frame and in substantial contact therewith so as to be retained in place, and to be guided in its rotation, by said cheeks, said spool being retained against transverse movement by said cheeks of the frame.

6. A holder for coiled box strapping embodying a hanger frame between the side members of which the coil of box strapping is adapted to be positioned, said frame being bent from a single piece of metal to produce side members which latter are bent inwardly toward each other to form closely positioned cheeks parallel to each other, a spool having a single web and a circular rim formed by bending said web on a plane substantially perpendicular to the plane of the web, the width of which rim exceeds the spaces between the parallel cheeks, said single web of the spool being positioned between and contacting with the parallel cheeks, and means for rotatably supporting the spool within the hanger.

7. In a holder for coiled box strapping, the combination of a hanger frame the side members of which are provided with parallel cheeks positioned in close relation to each other, a rotatable spool embodying a single flat web and a wide circular rim extending from the periphery of the web in alternate directions, and a journal for supporting the spool rotatably in the hanger frame, the single web of said spool being positioned intermediate the cheeks for the faces of said spool web to contact with the inner faces of said cheeks on the hanger frame, the width of the circular rim exceeding the space between the opposing cheeks of said hanger frame.

8. In a holder for coiled box strapping, a hanger frame bent from a piece of metal and having the end portions thereof positioned in overlapping relation, said overlapping end portions being bent to form a cheek, and the other side of the frame being bent inwardly to form another cheek positioned parallel to said first cheek, combined with a rivet connecting the lapping end portions of the frame and extending through the cheeks, and a spool rotatably supported by the rivet and retained by the rivet intermediate the cheeks of said frame to preclude transverse movement of the spool.

9. In a structure of the class described, the combination of a hanger and a spool rotatably mounted therein, said spool comprising a substantially flat disk and a wide rim formed by flanges extending from the periphery thereof in alternate directions and at right angles to the faces of the disk to produce a surface upon which material is adapted to be compactly coiled.

10. In a holder of the class described, a hanger frame formed from a single piece of metal to produce a plurality of loops of a predetermined width and a bearing portion of less width than said loops, said bearing portion being formed by bending the metal inwardly and into parallel relation intermediate the loops, and a spool comprising a substantially flat disk adapted to be rotatably mounted at the narrow part of the hanger, and with a wide rim formed by bending said disk in opposite directions.

In testimony whereof I have signed my name to this specification in the presence of two subscribing witnesses.

GEORGE C. D. MILLER.

Witnesses:
M. C. Rodriguez,
H. I. Bernhard.

Copies of this patent may be obtained for five cents each, by addressing the "Commissioner of Patents, Washington, D. C."